United States Patent [19]

Cohen

[11] Patent Number: 5,057,227

[45] Date of Patent: Oct. 15, 1991

[54] METHOD FOR IN-SITU REMOVAL OF HYDROCARBON CONTAMINANTS FROM GROUNDWATER

[75] Inventor: Arthur D. Cohen, Columbia, S.C.

[73] Assignee: University of South Carolina, Columbia, S.C.

[21] Appl. No.: 594,847

[22] Filed: Oct. 9, 1990

[51] Int. Cl.⁵ .............................................. C02F 1/28
[52] U.S. Cl. .................................. 210/680; 210/691; 210/747
[58] Field of Search .............. 210/679, 680, 691, 747

[56] References Cited

U.S. PATENT DOCUMENTS

| | | | |
|---|---|---|---|
| 3,791,990 | 2/1974 | Fischer | 210/691 |
| 4,473,477 | 9/1984 | Beall | 210/747 |
| 4,576,717 | 3/1986 | Collin et al. | 210/747 |

*Primary Examiner*—Ivars Cintins
*Attorney, Agent, or Firm*—Brumbaugh, Graves, Donohue & Raymond

[57] ABSTRACT

A method for in-situ removal of hydrocarbon contaminants from groundwater comprises contacting in-situ groundwater containing hydrocarbon contaminants such as gasoline and its components in aqueous solution with a permeable barrier comprising a peat material. In one embodiment, the groundwater stream containing hydrocarbon contaminants in aqueous solution is contacted in-situ with the permeable barrier, with the permeable barrier being positioned substantially perpendicular to the groundwater stream incident thereto. In another embodiment, the groundwater stream containing hydrocarbon contaminants in aqueous solution is contacted in-situ with a permeable barrier which comprises, in series, an immobilized nutrient layer and peat material layer, and the permeable barrier is positioned substantially perpendicular to the groundwater stream incident thereto. The immobilized nutrient layer enhances the natural degradation of the hydrocarbon contaminants, and any contaminants which are not degraded in the immobilized nutrient layer are removed by the peat material layer.

8 Claims, 9 Drawing Sheets

METHOD FOR IN-SITU REMOVAL OF HYDROCARBON CONTAMINANTS FROM GROUNDWATER

BACKGROUND OF THE INVENTION

This invention relates to a method for in-situ removal of hydrocarbon contaminants from groundwater. More particularly, this invention relates to a method for in-situ removal of hydrocarbon contaminants in aqueous solution from groundwater in which the groundwater containing the hydrocarbon contaminants is contacted with a permeable barrier comprising a peat material. The permeable barrier captures the hydrocarbon contaminants contained in solution within the groundwater, and the purified groundwater thereafter exits from the permeable barrier.

Loss of gasoline and other petroleum-derived hydrocarbons from underground storage tanks, pipelines and other facilities is one of the major sources of groundwater contamination in the United States. There are currently about 1.4 million underground tanks storing gasoline in the United States. It has been estimated that 10 percent or more of these tanks may be leaking and contaminating groundwater supplies.

Conventional technology for managing groundwater which has become contaminated with hydrocarbon contaminants such as petroleum products may be categorized into four categories: (1) containment of the contaminants using either physical barriers (i.e. slurry cutoff walls or sheet pilings) or hydraulic barriers created by a system of injection and pumping wells; (2) pumping of the contaminated groundwater to a treatment process at the surface, followed by disposal or reuse of the treated water; (3) removal of contaminated soil, with subsequent soil treatment or disposal; and (4) in-place stabilization of aquifer contaminants. Frequently, in practice, a combination of one or more of these alternatives is used, e.g. excavation of the most highly contaminated soil combined with a pump-and-treat process for contaminated groundwater.

Although conventional groundwater restoration techniques are effective when properly designed and implemented, they continue to have numerous problems associated with them. These include: (1) large amounts of water to be treated; (2) undesirable by-products; (3) large and long-term disruption of the site; and (4) extensive amounts of time required for complete site restoration.

In view of the foregoing, it would clearly be advantageous to employ a method of removing hydrocarbon contaminants from groundwater in-situ, thereby treating the groundwater and simultaneously avoiding many of the problems attendant to the above-described methods. One in-situ technique for removing hydrocarbon contaminants from groundwater which has been suggested is the use of a permeable barrier in-situ which allows passage of groundwater therethrough but intercepts soluble contaminants, as disclosed, for example in B. M. Thomson & S. P. Shelton, "Permeable Barriers: A New Alternative for Treatment of Contaminated Groundwaters", in Proceedings of the Focus Conference on Southwest Groundwater Issues, Association of Groundwater Scientists and Engineers, pp. 441-53 (Albuquerque, N.M. 1988). However, the makeup of such a permeable barrier is critical in the in-situ removal of hydrocarbon contaminants from groundwater, in that the material employed must be relatively low in cost, compatible with the surrounding soil and topology, yet capable of removing the undesired contaminants from groundwater.

Peat has long been valued for many uses, particularly as a fuel, in agricultural and horticultural uses, and as a raw feed stock for a variety of chemicals. More recently, the use of peat materials in environmental pollution control applications has been studied, as described, for example, in J. K. McLellan & C. A. Rock, "The Application of Peat in Environmental Pollution Control: A Review", in International Peat Journal, vol. 1, pp. 1-14 (1986). More particularly, the use of peat and peat mixtures as an absorbent for the removal of surface oil on the surface of the ground or water, typically caused by an oil spill, has been previously disclosed. For example: U.S. Pat. No. 4,778,602 (Allen) discloses the use of a chemically modified peat material as a filtering medium and for the removal of oil from water surfaces by sprinkling the finely powdered filtering media on the oil-laden water surface; European Patent Application No. 075,384 discloses a process for preparing an oil absorbent peat material which comprises mixing peat with an alkaline earth metal basic product, drying the mixture, adding additional alkaline earth metal basic product to the mixture, and heating the mixture until the peat has the desired moisture content; and Canadian Patent No. 1,135,241 (Mackey) discloses a method for collecting oil from oil spills by applying diatomaceous earth and a buoyant material which may be peat to an oil spill on a water surface, the buoyant material acting to cause the clay-like product created by the oil-soaked diatomaceous earth to float for eventual removal.

However, leaking underground gasoline storage tanks, pipelines and the like typically cause contamination of a given groundwater stream by a mechanism wherein the individual organic contaminants contained therein are in solution with the aqueous groundwater stream. Thus, the requirements for removal of hydrocarbon contaminants such as gasoline and its components (e.g. benzene, toluene, and xylene) in solution from groundwater are distinct from those where hydrocarbons such as oil are removed by absorption from ground or water surfaces; i.e., the removal of hydrocarbon contaminants in aqueous solution from groundwater requires adsorption of the contaminants by an adsorbing medium capable of removing the contaminants in aqueous solution from the groundwater.

It is one object of this invention to provide a method for in-situ removal of hydrocarbon contaminants such as gasoline and its components from groundwater, in which groundwater containing hydrocarbon contaminants in aqueous solution is contacted in-situ with a permeable barrier comprising a peat material. It is one feature of this invention that the removal of hydrocarbon contaminants from aqueous solution with the groundwater is accomplished with greater efficiency, lower capital costs, lower operating costs, and reduced surface and other environmental disturbances in comparison with typical conventional techniques as previously described. Thus, the method of this invention advantageously has lower costs associated with it than conventional means of removing hydrocarbon contaminants in aqueous solution from groundwater, and in addition advantageously avoids large disruptions of ground surfaces, as well as the use of large quantities of water, which often are difficult to obtain, and may themselves become contaminated, posing further problems of treatment and disposal.

It is another object of this invention to provide a method for in-situ removal of hydrocarbon contaminants such as gasoline and its components from groundwater, in which hydrocarbon contaminants in aqueous solution are removed by contacting the groundwater in-situ with a permeable barrier comprising in series a combination of an immobilized nutrient layer and a peat material layer, with the permeable barrier positioned substantially perpendicular to the groundwater stream incident thereto. It is another feature of this invention that the immobilized nutrient layer enhances the natural degradation of the hydrocarbon contaminants, and any contaminants which are not degraded in the immobilized nutrient layer are adsorbed by the peat material layer, thus advantageously avoiding large disruptions of ground surfaces and the use of large quantities of water.

It is yet another object of this invention to provide a method for in-situ removal of hydrocarbon contaminants in solution in groundwater in which the groundwater is contacted in-situ with a permeable barrier comprising a peat material, wherein the peat material is characterized by having ash content, birefringent organic content, fiber content, guaiacyl lignin pyrolysis product content and furan pyrolysis product content values within a specified range, and thus is more effective in removing hydrocarbon contaminants in solution with groundwater than other peat materials not characterized by having such values. It is yet another feature of this invention that a peat material characterized by having such values of the above-described parameters, as specified herein, advantageously adsorbs hydrocarbon contaminants such as gasoline and its components in aqueous solution in groundwater.

It is yet another object of this invention to provide a method for in-situ removal of hydrocarbon contaminants in solution in groundwater, in accordance with this invention, wherein naturally occurring peat materials are employed in the permeable barrier having the contaminant-laden groundwater stream incident thereto. It is yet another feature of this invention that naturally occurring peat materials may be employed in the permeable barrier of this invention, thus advantageously avoiding the use of chemically treated peat materials, which are typically more expensive and less readily available than naturally occurring peat materials, and which may have other attendant problems associated with their use in-situ.

SUMMARY OF THE INVENTION

This invention is directed to a method for in-situ removal of hydrocarbon contaminants from groundwater, where the contaminants are in aqueous solution with the groundwater. The method of this invention comprises contacting in-situ groundwater containing hydrocarbon contaminants in aqueous solution therewith such as gasoline and its components with a permeable barrier comprising a peat material. It has been found that naturally occurring peat materials characterized by having values within a specified range for certain parameters are particularly effective in recovering such hydrocarbon contaminants. More particularly, the naturally-occurring peat material preferably employed in this invention preferably has an ash content of 25% or less, more preferably in the range of 5-25%, a birefringent organic content of preferably 80% or less, more preferably 60% or less, a fiber content of preferably 80% or less, more preferably 60% or less, a guaiacyl lignin pyrolysis product content of preferably at least 10%, more preferably at least 12% and a furan pyrolysis product content of preferably at least 0.1%, more preferably at least 2%.

In one preferred embodiment of this invention, a groundwater stream containing hydrocarbon contaminants is contacted in-situ with a permeable barrier comprising a peat material, wherein the permeable barrier is positioned substantially perpendicular to the groundwater stream incident thereto. In another preferred embodiment of this invention, a groundwater stream containing hydrocarbon contaminants is contacted in-situ with a permeable barrier which comprises in series an immobilized nutrient layer and a peat material layer, the permeable barrier being positioned substantially perpendicular to the groundwater stream incident thereto, with the groundwater stream first contacting the immobilized nutrient layer and thereafter contacting the peat material layer. The immobilized nutrient layer may typically comprise one or more components selected from the group consisting of limestones, clays, iron oxides, coals, soils, and fly ashes.

This invention is advantageous over conventional methods for removing hydrocarbon contaminants in aqueous solution from groundwater streams in that it avoids the use of large amounts of water, it avoids the production of undesirable by-products, it avoids large and long-term disruption of the particular site, and its avoids the large costs typically associated with techniques such as removal of contaminated soil and/or pumping of contaminated groundwater to a treatment process.

DESCRIPTION OF THE PREFERRED EMBODIMENTS

Figure 1A:
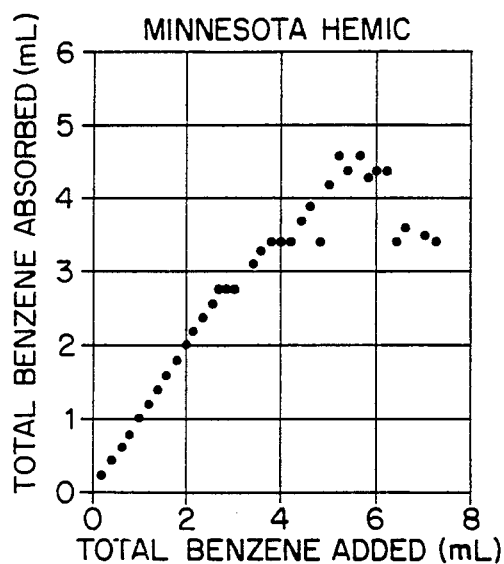
FIGS. 1A-1E depict experimental results obtained for benzene absorption for various peat materials.
Figure 1B:
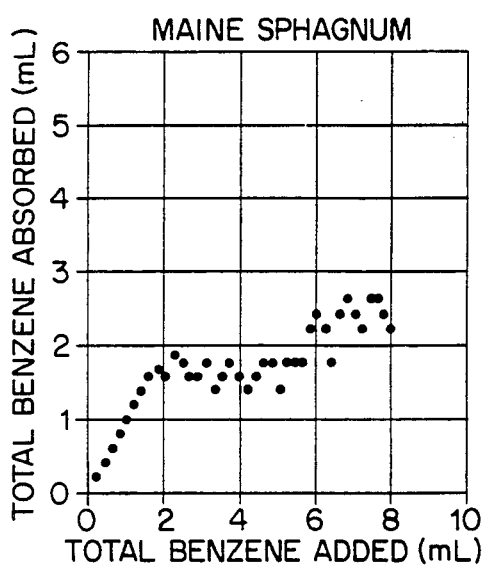
Figure 1C:
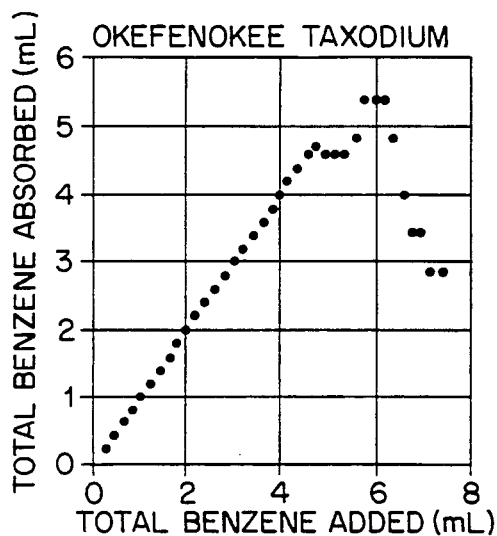
Figure 1D:
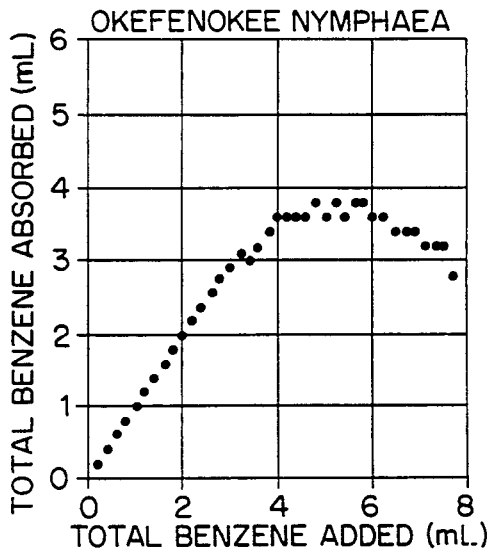
Figure 1E:
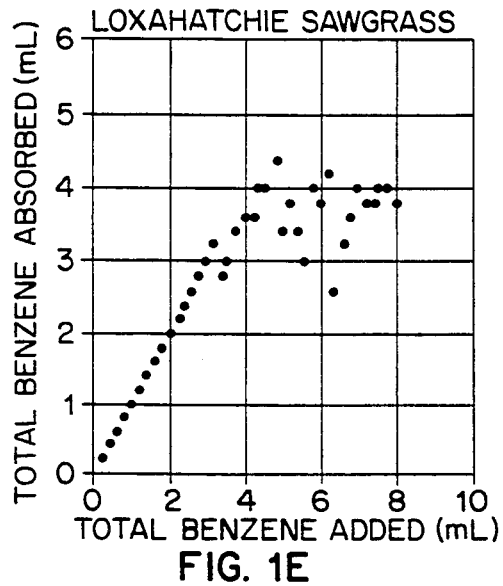

The method of this invention comprises contacting, in-situ, groundwater containing hydrocarbon contaminants such as gasoline in aqueous solution with a permeable barrier comprising a peat material.

As used in this description and in the appended claims, the term "hydrocarbon contaminants" refers to organic contaminants which are typically associated with groundwater pollution due to the leakage of underground storage tanks, pipe lines and the like, and which are in solution with the groundwater stream or body which is treated in accordance with this invention. Accordingly, ordinary absorption techniques such as those typically employed in methods for the removal of surface oil contamination from ground surfaces and water surfaces are ineffective in the hydrocarbon contaminated groundwater systems to which the present invention relates. In one particularly preferred embodiment, "hydrocarbon contaminants" refers to the components of fuel compositions such as gasoline and the like, including benzene, toluene, xylenes, ethers, organic-based fuel additive compositions, and other organic constituents of motor fuel compositions such as gasoline and the like. Such compounds typically contaminate groundwater streams due to leakage from underground storage tanks and/or pipelines.

As used in this description and in the appended claims, the term "peat material" refers to an accumulation of partly decomposed plant material, which may vary in consistency from a fibrous matted material to a highly decomposed mud. Peat material typically contains both organic matter derived from the decomposed plants and inorganic or mineral matter derived from both the decomposed plants and from clay and sand which has either been washed or blown in during the filling in of the depression formed due to the decomposition of the plants and the formation of the peat material. Peat materials may be characterized according to various parameters, as is further discussed hereinbelow.

As used in this description and in the appended claims, peat material comprises both naturally occurring and chemically treated or modified peat materials, although naturally occurring peat material which has not been chemically treated or admixed with otter reagents is particularly preferred.

To determine the efficacy of the use of various types of peat materials in this invention, peat samples with different compositions were tested for their capacities to extract pure hydrocarbons (benzene, toluene, m-xylene) as both emulsions in water and in saturated solution in water. These peat samples were subjected to detailed chemical and physical analyses prior to being tested so that it could be established, which, if any of these measured compositional parameters correlated with extraction capacity.

The peat samples utilized in these tests are shown in Table 1. These consisted of: 1) a highly decomposed, *Taxodium-Persea*, woody peat from the Okefenokee Swamp of Georgia; 2) a moderately decomposed, *Nymphaea-Sagittaria* peat from the Loxahatchee National Wildlife Refuge in Florida; 3) a moderately decomposed, spruce-woody dicot peat from Minnesota; 4) a moderately decomposed, grass-sedge-fern peat from the Loxahatchee National Wildlife refuge in Florida; 5) a moderately decomposed *Nymphaea-Sagittaria*-grass-sedge peat from the Okefenokee Swamp of Georgia; and 6) a relatively undecomposed, Sphagnum peat from Maine. The hydrocarbons used for testing consisted of HPLC grade toluene, benzene, and 99% anhydrous m-xylene (obtained from Aldrich Chemical Company Inc.).

TABLE 1

Types and Source Locations of Peat Samples Tested

| SAMPLE DESIGNATION | LOCATION | DOMINANT BOTANICAL COMPONENTS | ASTM CLASS BY FIBER CONTENT* |
|---|---|---|---|
| Oke. Tax. | Okefenokee Swamp, GA | Taxodium (cypress) & Persea (bay) | Sapric |
| Lox. Nym. | Loxahatchee Wildlife Refuge, FL | Nymphaea (waterlily) & Sagittaria (arrowhead) | Hemic |
| Min. Hemic | Minnesota | Spruce & Woody Dicots | Hemic |
| Lox. Sawgrass | Loxahatchee Wildlife Refuge, FL | Grass-sedge, fern, Nymphaea | Hemic |
| Oke. Nym. | Okefenokee Swamp, GA | Nymphaea, Sagittaria, Grass-sedge | Hemic |
| Maine Sphag. | Maine | Sphagnum (peat moss) | Fibric |

*ASTM Standard Classification of Peat Samples by Laboratory Testing (D4427-84)

A number of physical property parameters were determined for each of the peat samples tested. These parameters consisted of bulk density, fiber content, pH, porosity, and birefringence. The values obtained for each peat sample are set forth in Table 2.

TABLE 2

Physical Properties of Peats

| SAMPLE DESIG. | BULK DENSITY (g/cm$^3$) | FIBER CONTENT (area %) | pH (in water) | POROSITY (area %) | BIREFRINGENT ORGANIC (area %) |
|---|---|---|---|---|---|
| Oke. Tax. | 0.123 | 17.5 | 3.14 | 36 | 20 |
| Lox. Nym. | 0.069 | 40.0 | 7.94 | 37 | 52 |
| Minn. Hemic | 0.124 | 55.5 | 4.78 | 29 | 48 |
| Lox. Sawgrass | 0.076 | 48.0 | 6.65 | 41 | 43 |
| Oke. Nym. | 0.078 | 50.0 | 4.53 | 52 | 54 |
| Maine Sphag. | 0.083 | 80.5 | 4.29 | 48 | 78 |

As used in this description and in the appended claims, "bulk density" is a measure of the dry weight of a given wet volume of peat. This was determined by cutting out a measured volume of in-situ wet peat, drying at 105° C. for 24 hrs., weighing the resultant dry peat, and dividing this weight by the volume (ASTM Standard Test Method 4531-86).

As used in this description and in the appended claims, "fiber content" is a measure of the degree of preservation of the tissue fragments in the peat. It is expressed as the percent by weight or volume of particles greater than 150 microns in any dimension (but less than 20 mm) relative to the original weight or volume. For this study fiber content was determined microscopically using the volume method described in Cohen, A. D., "Obtaining More Precise Descriptions of Peat By Use of Oriented Microtome Sections", in Testing of Peats and Organic Soils (Jarrett, P. ed. 1982), ASTM STP 820, pp. 21-36, incorporated herein by reference.

As used in the description and in the appended claims, "birefringence" is a measurement of the difference between the maximum and minimum indices of refraction of polarized light passing through an object. The values set forth in Table 2 indicate the percentage of organic matter in microtome thin sections that exhibited birefringence under crossed polarized light rather than the intensity of birefringence. This measurement gave an estimation of the amount of non-decomposed cellulosic tissue present in the sample.

Measurement of the pH in water was done in the laboratory using a standard digital pH meter. Porosity (i.e. pore space) was measured microscopically by point counting. Botanical composition, fiber content, porosity, and birefringence were all measured from microtome sections of the peats using a Leitz Orthoplan microscope. Microtome sections were prepared by the method described by Cohen, previously discussed. This involved fixing in a formaldehyde-acetic acid-ethyl alcohol solution, dehydrating in alcohols, embedding in paraffin, and slicing of 15 micron thick sections with a sliding microtome.

Table 3 shows partial "proximate" and "ultimate" analyses obtained for the peats. Proximate analysis is a determination of the weight percentage of moisture, ash, fixed carbon and volatile matter in a sample (following ASTM Standard Method D 3172-73). Ultimate analysis is a determination of the weight percent of elemental carbon, hydrogen, oxygen, nitrogen, and sulfur (utilizing ASTM Standard Method D 3176-84). These types of analyses are routinely performed, for example, on coals to assess their industrial properties. Ultimate analyses were obtained commercially from Dickinson Laboratories, El Paso, Tex. and proximate analyses from Los Alamos National Laboratory. The inorganic chemical composition of the peat, set forth in Table 4 was determined at Los Alamos National Laboratory by X-ray fluorescence (XRF) according to the method disclosed in Raymond, R. R. et al., "Variation of Inorganic Content of Peat With Depositional and Ecological Setting", in Recent Advances in Coal Geochemistry (Chyi, L. L. et al. eds. 1990), pp. 1-12, incorporated herein by reference.

TABLE 3

| | Proximate and Ultimate Analyses of Peats | | | | | | | |
|---|---|---|---|---|---|---|---|---|
| SAMPLE DESIG. | ASH CONTENT (wt. %, dry) | ORGANIC MATTER (wt. %, dry) | FIXED CARBON (wt. %, dry) | C wt. % dry | H wt. % dry | O wt. % dry | N wt. % dry | S wt. % dry |
| Oke. Tax. | 13 | 87 | 26 | 51 | 5 | 28 | 2 | 0.3 |
| Lox. Nym. | 6 | 94 | 26 | 54 | 6 | 28 | 4 | 0.7 |
| Minn. Hemic | 10 | 90 | 29 | 53 | 5 | 30 | 2 | 0.2 |
| Lox. Sawgrass | 7 | 93 | 33 | 54 | 5 | 29 | 3 | 1.0 |
| Oke. Nym. | 12 | 88 | 27 | 52 | 5 | 27 | 3 | 0.4 |
| Maine Sphag. | 1 | 99 | 28 | 52 | 6 | 41 | 0.5 | 0.1 |

TABLE 4

| Inorganic Chemical Composition of Peats (wt. % of whole peat sample by XRF-modified from Raymond et al.) | | | | | | | | | | |
|---|---|---|---|---|---|---|---|---|---|---|
| SAMPLE DESIGNATION | Si | Ti | Al | Fe | Mn | Mg | Ca | Na | K | P |
| Oke. Tax. | 5.4 | 0.02 | 0.30 | 0.11 | tr | 0.02 | 0.02 | 0.02 | 0.03 | 0.05 |
| Lox. Nym. | 0.7 | 0.01 | 0.20 | 0.36 | tr | 0.10 | 1.66 | 0.05 | 0.02 | 0.02 |
| Minn. Hemic | 2.8 | 0.04 | 0.63 | 0.72 | tr | 0.10 | 0.60 | 0.06 | 0.16 | 0.05 |
| Lox. Sawgrass | 0.5 | 0.01 | 0.16 | 0.20 | tr | 0.29 | 2.40 | 0.04 | 0.02 | 0.02 |
| Oke. Nym. | 5.1 | 0.01 | 0.21 | 0.20 | 0.3 | 0.02 | 0.02 | 0.02 | 0.02 | 0.02 |
| Maine Sphag. | 0.1 | tr* | 0.06 | 0.03 | tr | 0.20 | 0.09 | 0.02 | 0.01 | 0.02 |

*trace

Organic chemical characterization of the peat samples was accomplished by utilizing a combination of pyrolysis gas chromatography/Fourier transform infrared spectroscopy with flame ionization detection (Py-GC/FT-IR/FID) and pyrolysis gas chromatography/mass spectrometry (Py-GC/MS) as described by Durig, J. R. et al., "Development of a Pyrolysis-Gas Chromatograph-Fourier Transform Infrared Spectroscopic Technique for the Study of Wood Peats", J. Anal. Appl. Pyrol., Vol. 14, pp. 295-308 (1989), incorporated herein by reference. Identification of the pyrolysis vapors was conducted by comparison of FT-IR and mass spectra with EPA and NBS (NIST) libraries, respectively, and by comparison with literature references. One hundred eight compounds were positively identified and quantitative data for 33 of the most abundant ones was compiled and tabulated for each peat type, as set forth in Table 5. In Table 5, the pyrolysis compounds are grouped by functionality (e.g. aldehydes, furans, furanones, pyranones, other ketones, guaiacyl lignin based products, and other lignin based products).

TABLE 5

Organic chemical compounds identified in peat by Py/GC/MS and PY/GC/FT-IR

| FID Retention time | Compound | Origin* | PERCENT ABUNDANCE ||||||
|---|---|---|---|---|---|---|---|---|
| | | | OKE TAX | LOX NYM | MINN HEMIC | LOX SAW | OKE NYM | MAINE SPHAG |
| ALDEHYDES ||||||||| 
| 2.33 | 2-propenal | | 1.418 | 2.510 | 0.681 | 0.590 | 4.894 | 0.189 |
| 2.95 | pyruvaldehyde | PS | 0.548 | 0.624 | 0.522 | 1.469 | 0.415 | 0.042 |
| 7.44 | 2-furaldehyde | PS | 6.266 | 2.685 | 3.888 | 4.831 | 6.858 | 12.471 |
| 8.81 | 5-methyl-2-furaldehyde | PS | 2.789 | 2.193 | 1.689 | 1.222 | 1.670 | 0.189 |
| | Total Aldehydes | | 11.021 | 8.012 | 6.780 | 8.112 | 13.837 | 12.891 |
| FURANS |||||||||
| 3.10 | 2-methylfuran | PS | 1.061 | 0.637 | 0.463 | 1.403 | 0.771 | 0.094 |
| 3.28 | 3-methylfuran | PS | 1.036 | 0.414 | 0.494 | 0.754 | 0.975 | 0.772 |
| 4.52 | dimethylfuran | PS | 0.919 | 0.431 | 0.332 | 0.746 | 0.619 | 0.078 |
| 7.67 | 2-nor-propylfuran | PS | 0.651 | 0.666 | 0.329 | 1.657 | 0.348 | 0.260 |
| 9.24 | 2-methyl-5-acetylfuran | PS | 0.804 | 0.997 | 0.708 | 0.000 | 0.628 | 1.037 |
| 9.84 | methyldihydrobenzofuran | PS | 0.930 | 0.942 | 0.733 | 0.110 | 0.673 | 0.000 |
| 10.72 | 4,7-dimethylbenzofuran | PS | 0.858 | 1.168 | 1.238 | 0.376 | 0.716 | 0.685 |
| | Total Furans | | 6.259 | 5.255 | 4.297 | 5.046 | 4.730 | 2.926 |
| FURANONES |||||||||
| 7.18 | 3-furanone | HEX | 0.000 | 2.143 | 1.590 | 1.348 | 0.854 | 6.809 |
| 7.87 | 5-methyl-3-furanone | HEX | 1.949 | 2.030 | 1.072 | 1.166 | 1.657 | 1.364 |
| 8.63 | 5-methyl-2-furanone | HEX | 0.660 | 2.156 | 1.942 | 1.195 | 1.237 | 3.793 |
| 9.05 | 2-furanone | HEX | 1.127 | 1.462 | 1.041 | 0.654 | 0.778 | 3.102 |
| | Total Furanones | | 3.376 | 7.791 | 5.645 | 4.363 | 4.592 | 15.068 |
| PYRANONES |||||||||
| 9.34 | 4-hydroxy-5,6-dihydro-2-pyranone | PENT | 2.485 | 3.974 | 5.183 | 1.189 | 8.234 | 6.532 |
| 9.52 | pyran-2,5-dione | HEX | 0.931 | 1.276 | 0.000 | 0.362 | 0.909 | 0.946 |
| | Total Pyranones | | 3.416 | 5.250 | 5.183 | 1.551 | 9.143 | 7.478 |
| OTHER KETONES |||||||||
| 2.49 | 2-propanone | PS | 1.826 | 3.080 | 1.806 | 2.031 | 1.755 | 1.749 |
| 8.15 | 2-methyl-2-cyclopenten-1-one | PS | 0.775 | 0.652 | 0.138 | 0.128 | 0.200 | 0.662 |
| 9.15 | 1-penten-3-one | PS | 0.728 | 1.110 | 0.813 | 0.790 | 0.798 | 1.137 |
| | Total Other Ketones | | 3.329 | 4.842 | 2.757 | 2.949 | 2.753 | 3.548 |
| | Total All Ketones | | 10.481 | 17.883 | 13.585 | 8.863 | 16.488 | 26.094 |
| GUAIACYL LIGNINS |||||||||
| 9.97 | guaiacol | GLIG | 2.383 | 4.364 | 4.513 | 4.465 | 2.817 | 2.585 |
| 10.93 | methylguaiacol | GLIG | 5.165 | 2.840 | 5.788 | 2.389 | 2.843 | 5.314 |
| 12.36 | eugenol | GLIG | 3.061 | 3.358 | 2.411 | 3.455 | 4.967 | 0.956 |
| 12.85 | cis-isoeugenol | GLIG | 0.825 | 0.718 | 0.000 | 0.760 | 0.549 | 0.627 |
| 13.77 | guaiacyl isomer | GLIG | 1.480 | 1.167 | 0.000 | 0.987 | 1.181 | 0.502 |
| 14.75 | guaiacyl-2-propanone | GLIG | 0.951 | 0.725 | 0.000 | 0.524 | 0.216 | 0.545 |
| | Total Guaiacyl Based Lignins | | 13.865 | 13.172 | 12.712 | 12.580 | 12.537 | 10.529 |
| OTHER LIGNINS |||||||||
| 3.86 | benzene | LIG BIOD | 1.011 | 1.604 | 0.853 | 2.505 | 1.053 | 1.015 |
| 5.65 | toluene | LIG BIOD | 0.827 | 0.783 | 1.090 | 2.673 | 0.818 | 0.192 |
| 8.32 | ethenylmenthylbenzene | LIG | 0.803 | 0.877 | 0.584 | 0.383 | 0.879 | 1.138 |
| 9.64 | phenol | LIG BIOD | 3.393 | 1.782 | 8.100 | 4.827 | 1.226 | 11.580 |
| 10.39 | p-cresol | LIG | 2.290 | 2.505 | 4.196 | 2.925 | 1.745 | 2.507 |
| 12.11 | vinylphenol | LIG | 3.974 | 2.104 | 5.616 | 2.939 | 2.714 | 1.810 |
| 12.60 | syringol | S LIG | 1.134 | 0.822 | 1.777 | 0.515 | 0.809 | 0.441 |
| | Total Other Based Lignins | | 13.432 | 10.477 | 22.216 | 16.767 | 9.244 | 18.683 |
| | Total All Lignins | | 27.297 | 23.649 | 34.928 | 29.347 | 21.817 | 29.212 |

*Abbreviations used: PS, polysaccharide; HEX, hexosan; PENT, pentosan; LIG, lignin; G LIG, guaiacyl-derived lignin; S LIG, syringyl-derived lignin; LIG BIOD, lignin biodegradation products.

Experiments were conducted to determine the effectiveness of the peat samples in removing benzene, toluene and m-xylene from a water emulsion ("free-phase experiment") as follows. A peat slurry in water was prepared, placed in a calibrated centrifuge tube, centrifuged at maximum speed for three minutes, and the water was thereafter decanted. Additional amounts of peat slurry were added and centrifuged until a wet-packed volume of 10 ml was achieved. A constant wet-packed volume was utilized in all emulsion (and solution) experiments as opposed to a constant dry weight to simulate relatively natural peat for in-situ remediation of groundwater contamination, where the peat would be expected to achieve a certain packed volume under water saturated conditions.

After achieving the desired wet-packed volume, 20 ml of water was added. A 0.2 ml portion of either benzene, toluene, or m-xylene was then added and the tubes were sealed, shaken, and centrifuged at maximum speed for three minutes. The amount of hydrocarbon absorbed was determined by measuring the volume of free-phase hydrocarbon remaining after centrifugation. This procedure was repeated with 0.2 ml increments of hydrocarbon until no further absorption occurred. All experiments were conducted at 27° C.

FIG. 1 for benzene is illustrative of the results obtained for the various peat samples tested in terms of their absorbency of hydrocarbon contaminants (e.g. benzene) in aqueous emulsion. As shown in FIG. 1, all of the peats tended to absorb benzene to some degree (from 30-50% of their starting volume); however the Maine Sphagnum peat, shown here on a wet packed-volume basis, achieved somewhat less absorption per unit volume than the others. In Tables 1 and 2 it is shown that this peat had a high degree of fiber preservation, a high water-holding-capacity, and a relatively high microscopically measured porosity. Pore size was visibly larger in the Sphagnum peat than in the other types; pore size, type, and shape may also be significant factors in hydrocarbon absorbency, although these parameters were not measured.

Note also the desorption (or fluctuating absorption-desorption-absorption) exhibited by certain peats upon increased additions of hydrocarbon. At low concentrations, 100% of the hydrocarbon was absorbed. However, once a maximum value has been reached, it is possible that a free phase forms and the free phase competes with the sorbed phase for the total amount in the bottle. Note also that the peat types that were initially the most absorbent also tended to desorb the most.

Experiments were also conducted to determine the effectiveness of the peat samples in removing benzene, toluene and m-xylene from aqueous solution as follows. The peat slurries were placed into amber 40 ml EPA vials (equipped with TEFLON-coated silicone septa) and centrifuged to obtain a packed-volume of 20 ml for each peat type. Standing water was then removed from the vials to leave only solid wet-packed peat. A TEFLON-coated stirring bar was added to each vial and the vials were filled with a saturated aqueous solution of the hydrocarbon of interest. An additional vial was filled with only the saturated hydrocarbon solution and a stirring bar. TEFLON-lined screw caps were immediately placed on the vials so as to have zero air headspace within. These reaction vials were then shaken vigorously to affect a uniform texture and then placed on a magnetic stirring plate where they remained at 27° C. until water analysis was conducted (24 hours or 12 days later).

The saturated solutions of hydrocarbon were prepared by adding an excess of pure hydrocarbon (i.e. benzene, toluene or m-xylene) to 1 liter of water, shaking vigorously, and allowing the two phases to separate and equilibrate. In order to maintain saturation and to prevent volatilization, the separate phase hydrocarbon was allowed to "float" on top of the saturated water solution.

Hydrocarbon adsorption was determined by measuring the concentration that remained in solution for individual peat types. To determine this concentration, the reaction vials were centrifuged at high speed for 30 minutes to separate the solid peat tissues from the water. Afterward, 5 ml of water was removed from each vial (and the standard) and placed into separate 10 ml serum vials, which were stoppered with MININERT syringe valves (made of TEFLON, and available from Supelco, Inc.) and left to equilibrate at 21° C. for 6 hours.

Static headspace analysis was performed in triplicate for each sample (and the standard) by withdrawing (through the MININERT valve) 5 microliters of air with a Hamilton 1701 N gas-tight syringe fitted with a Chaney adapter. The headspace gas was injected onto a Hewlett-Packard 5880A capillary gas chromatograph containing a J&W DB1701 capillary column (30 m×0.32 mm ID×1 μm film thickness) and equipped with a flame ionization detector. The oven program utilized was: 40° C. held for 2 minutes; a ramp of 10° C./minute to 100° C. (170° C. for m-xylene); and a post run temperature of 150° C. (200° C. for m-xylene) held for 5 minutes. FID signals were processed with a Hewlett-Packard 5880 series GC integrator and averages for the triplicate runs were determined. The percentage of hydrocarbon remaining was calculated as the ratio of the sample FID area to that of the respective standard multiplied by 100.

Figure 2A:
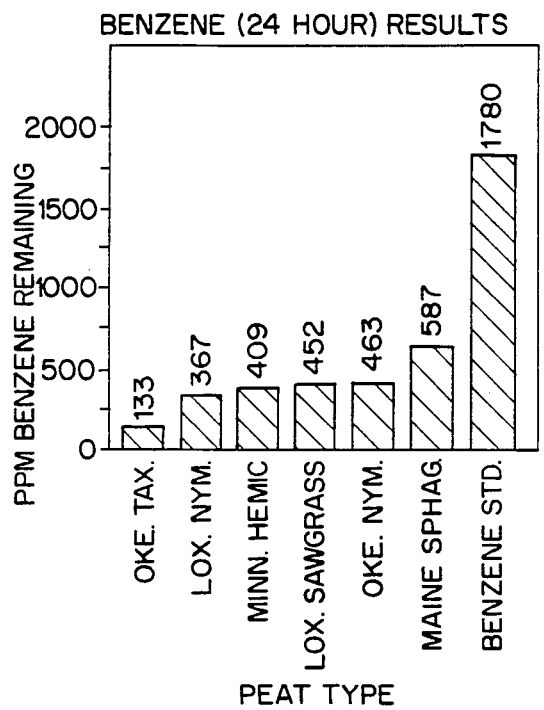
FIGS. 2A-2D depict experimental results obtained for adsorption for various hydrocarbon compounds and various peat materials.
Figure 2B:
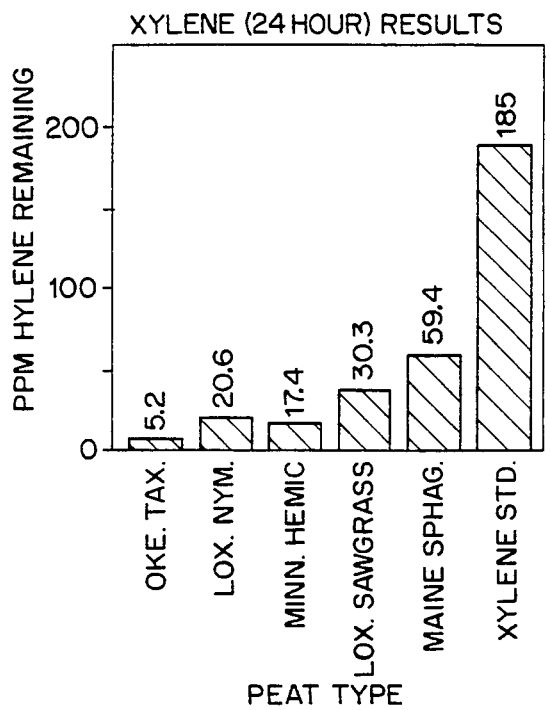
Figure 2C:
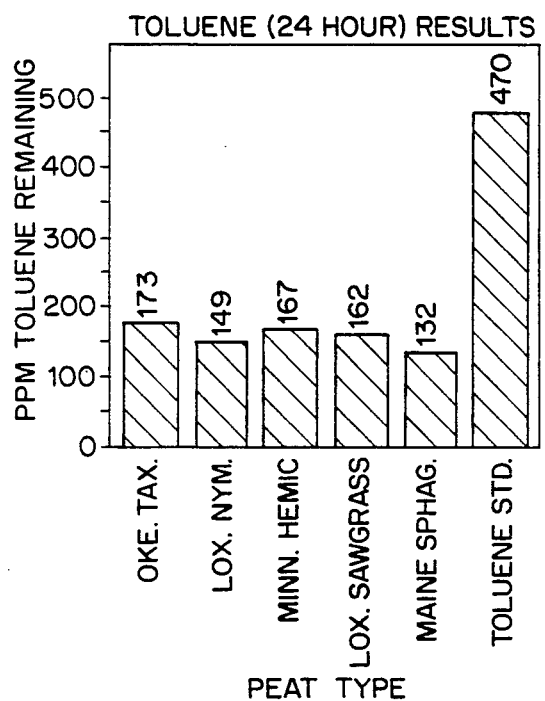

FIGS. 2A-2C set forth the results of the 24 hour slurry experiments using saturated solutions of the three hydrocarbons. Note that all peat types adsorbed significant amounts of the hydrocarbons from solution (63-97% of the standard). In FIGS. 2A and 2B it is shown that benzene and m-xylene exhibited somewhat similar trends with regard to the absorbencies of the peat types. The Okefenokee Taxodium peat adsorbed the greatest amounts of these two hydrocarbons, with only 133 ppm benzene and 5.3 ppm m-xylene remaining after 24 hours; whereas, the Maine Schagnum peat adsorbed the least, 587 ppm and 59.4 ppm benzene and m-xylene respectively. On the other hand, toluene exhibited an inverse relationship, the Maine Sphagnum being a slightly better adsorber in 24 hours than the Okefenokee Taxodium peat. It should be noted that for the toluene 24-hour results there is actually much less variation in absorption capacity between peat types than for either benzene or m-xylene.

Figure 2D:
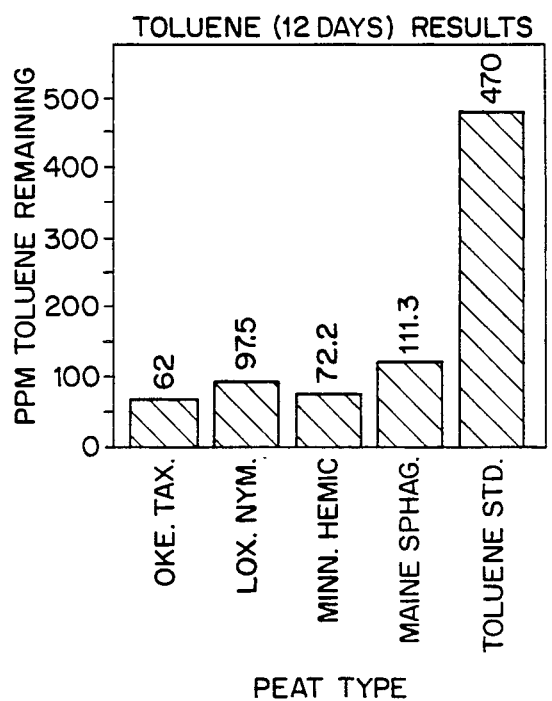
Figure 3A:
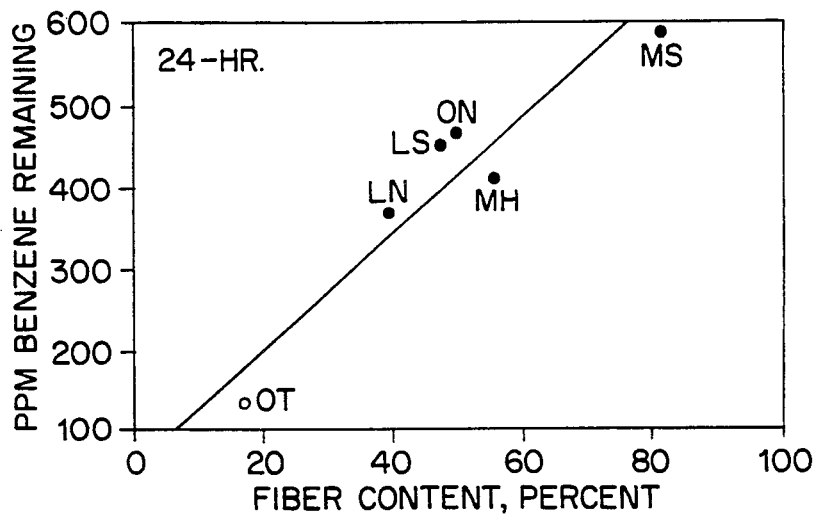
FIGS. 3A-3C depict experimental results obtained for various peat materials for hydrocarbon compound adsorption vs. peat material fiber content.
Figure 3B:
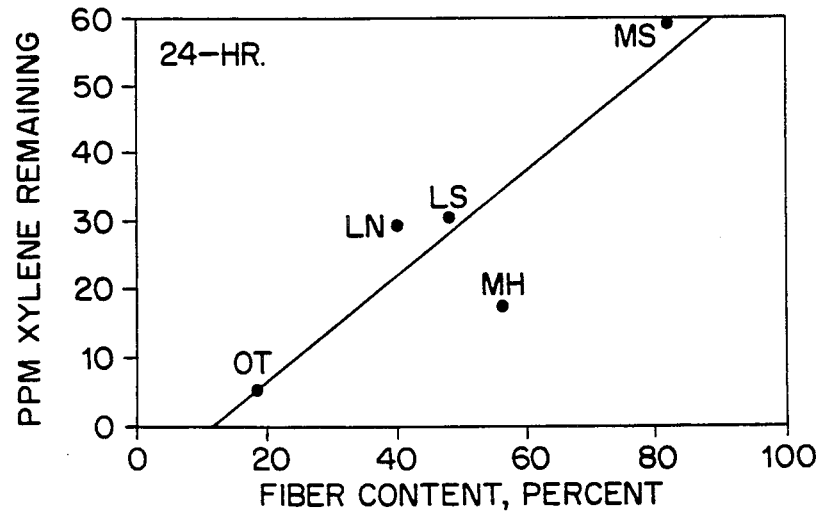
Figure 3C:
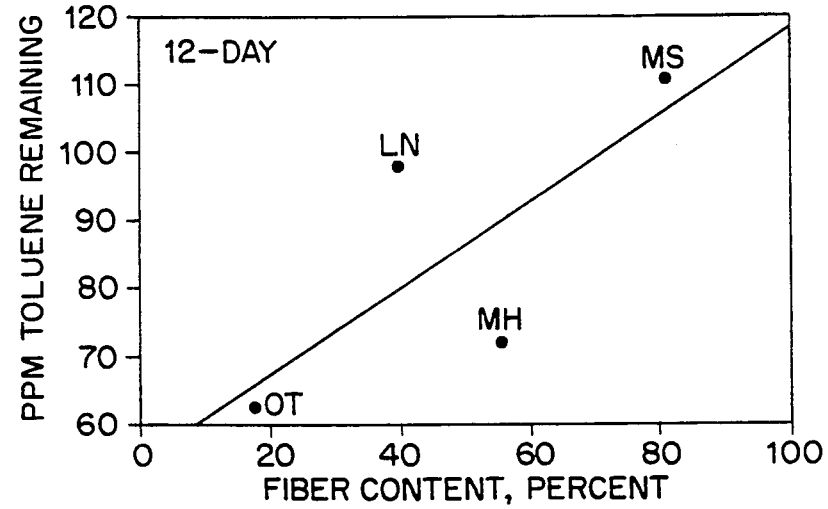
Figure 4A:
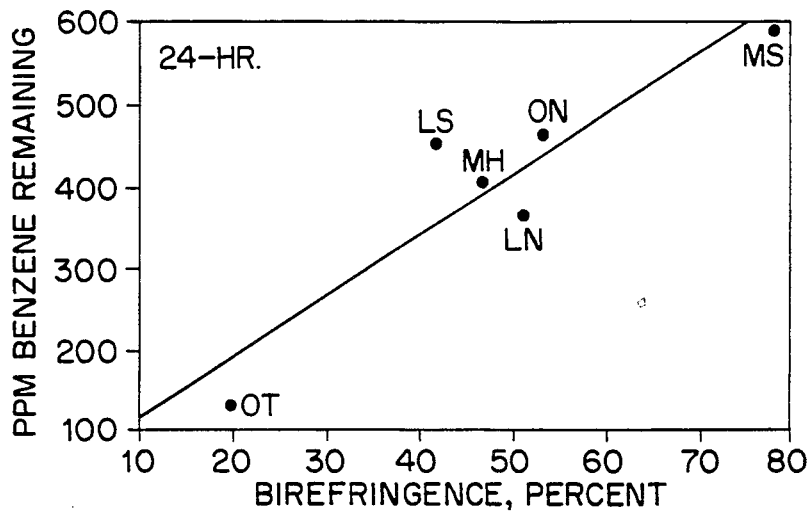
FIGS. 4A-4C depict experimental results obtained for various peat materials for hydrocarbon compound adsorption vs. peat material birefringence.
Figure 4B:
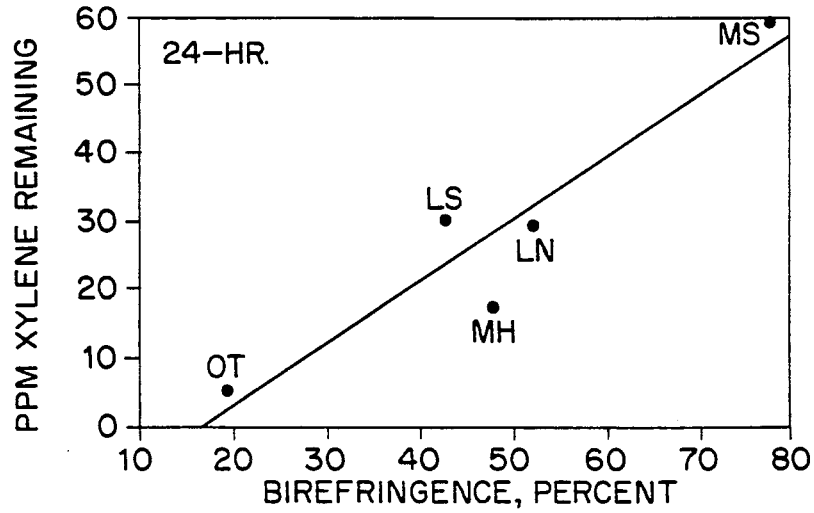
Figure 4C:
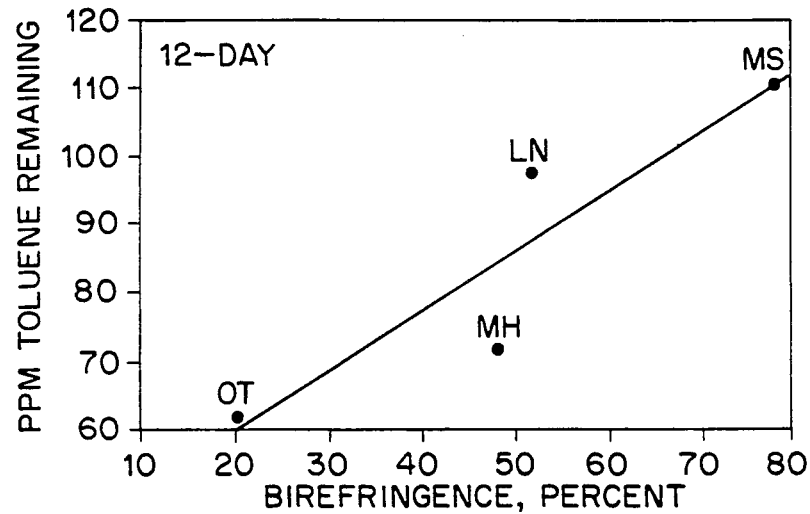
Figure 5A:
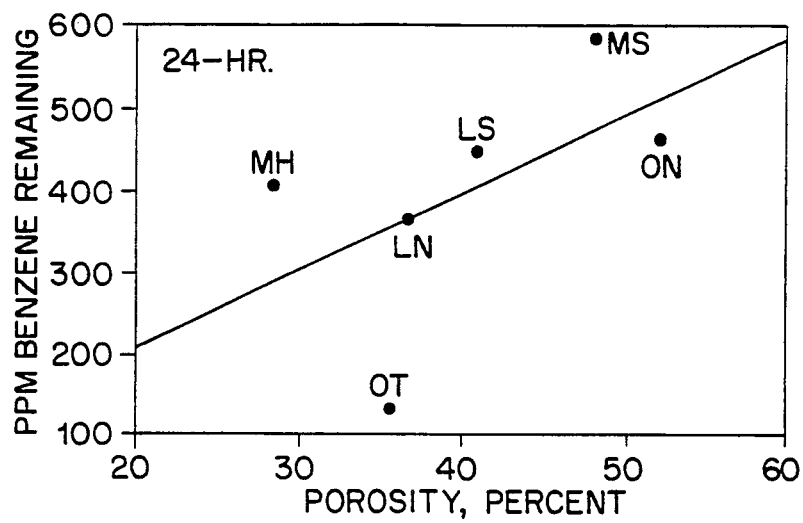
FIGS. 5A-5C depict experimental results obtained for various peat materials for hydrocarbon compound adsorption vs. peat material porosity.
Figure 5B:
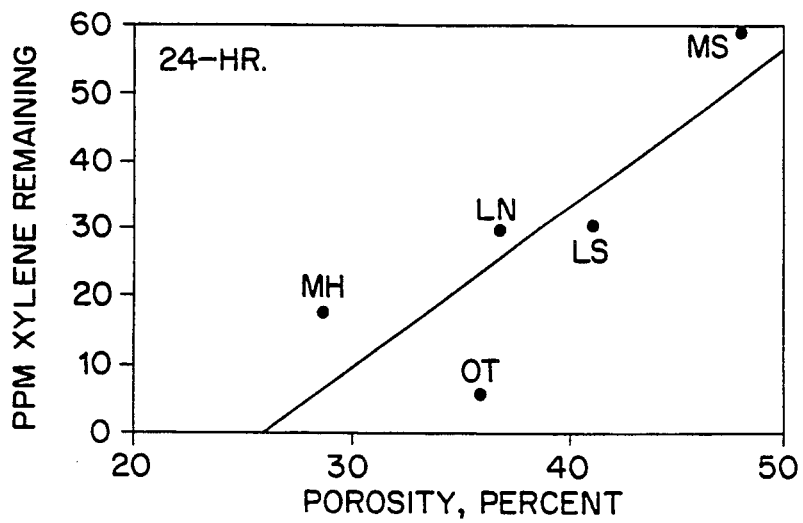
Figure 5C:
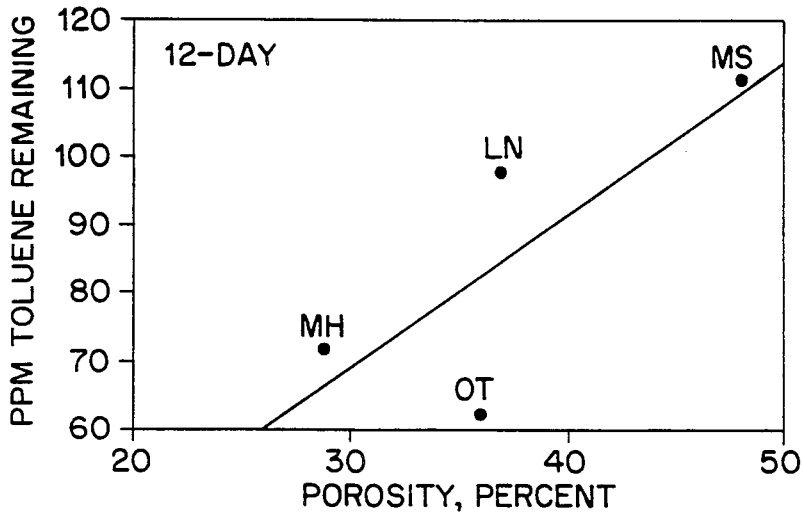

In FIG. 2D the results for toluene adsorbency for a duplicate set of samples slurried for 12 days rather than 24 hours are given. The sawgrass sample was accidentally contaminated during the experiment so it is not shown. Note that toluene remaining in solution has now been significantly reduced for all peat types. Furthermore, toluene adsorbency versus peat type now follows a similar pattern to that of benzene and m-xylene. This suggests that toluene takes longer to be adsorbed than the other two hydrocarbons. This factor may be important in designing a remediation system using peat (i.e. the longer contact time required to adsorb toluene).

In order to determine which physical or chemical characteristics of the peats might be related to hydrocarbon adsorbency, the parameters shown in Tables 1-4 were plotted against the 24-hour test results for benzene and m-xylene and 12-day results for toluene. The 12-day results were used for toluene because of its evident slowness in adsorption relative to the other hydrocarbons. The most significant correlations, i.e. for fiber content, birefringence, porosity, ash content, total guaiacyl lignin pyrolysis product, and total furan pyrolysis product, are set forth in FIGS. 3, 4, 5, 6, 7 and 8, respectively.

Of the physical characteristics measured, fiber content (FIGS. 3A, 3B and 3C) and birefringence (FIGS. 4A, 4B and 4C) exhibited relatively good correlation with adsorbency, with adsorption for all hydrocarbons decreasing with increasing fiber content (or birefringence). Both of these parameters are indicators of the degree of decomposition of the peat. Thus, adsorption appears to increase as decomposition increases. Without wishing to be bound by any one theory, this may be a function of (1) the greater surface areas produced as particle size decreased; (2) chemical changes induced by decomposition processes; or (3) inherent chemical or physical differences in the source plants that produce the peats.

Total porosity also showed some correlation with adsorbency (FIGS. 5A, 5B and 5C), with adsorbency decreasing with increasing pore space (although the correlation was not especially good for benzene). As noted previously with respect to the emulsion studies, pore size and shape might be as significant as total porosity. Note also that porosity was measured at relatively low power (100x); thus small pores were not recognized.

Figure 6A:
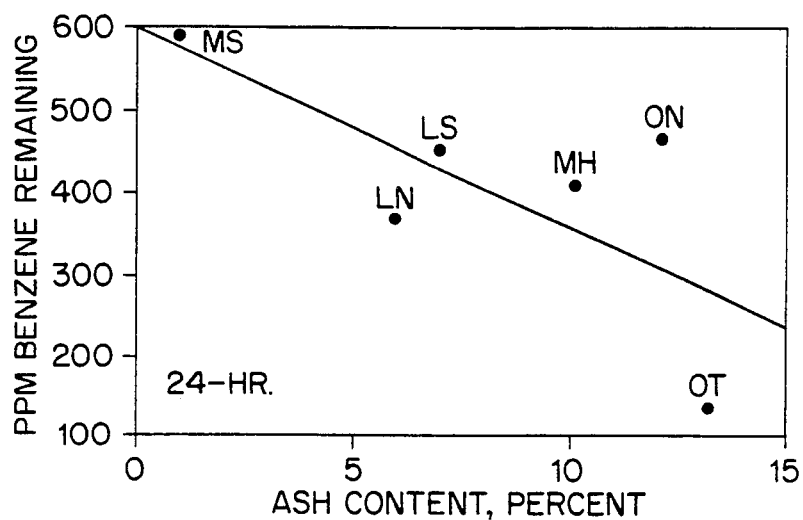
FIGS. 6A-6C depict experimental results obtained for various peat materials for hydrocarbon compound adsorption vs. peat material ash content.
Figure 6B:
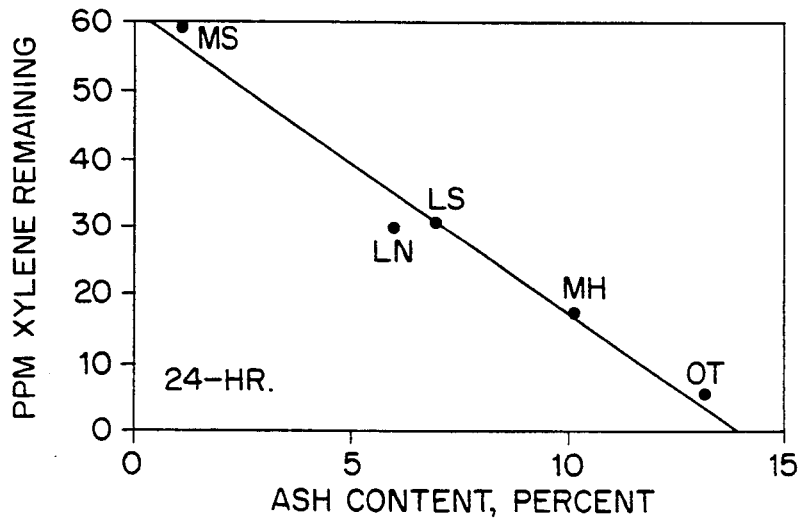
Figure 6C:
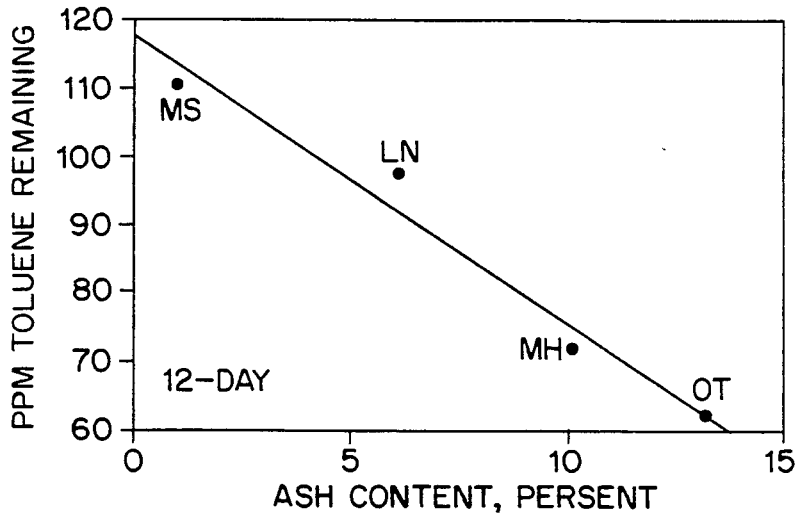
Figure 7A:
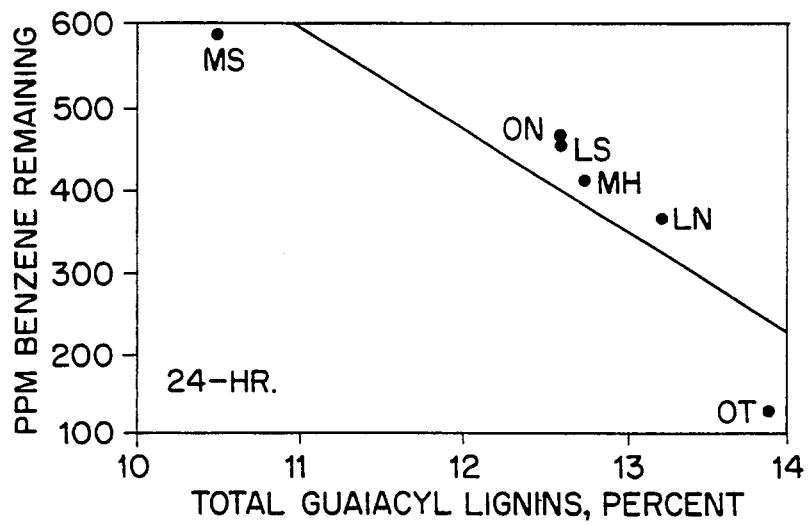
FIGS. 7A-7C depict experimental results obtained for various peat materials for hydrocarbon compound adsorption vs. peat material guaiacyl lignin pyrolysis product content.
Figure 7B:
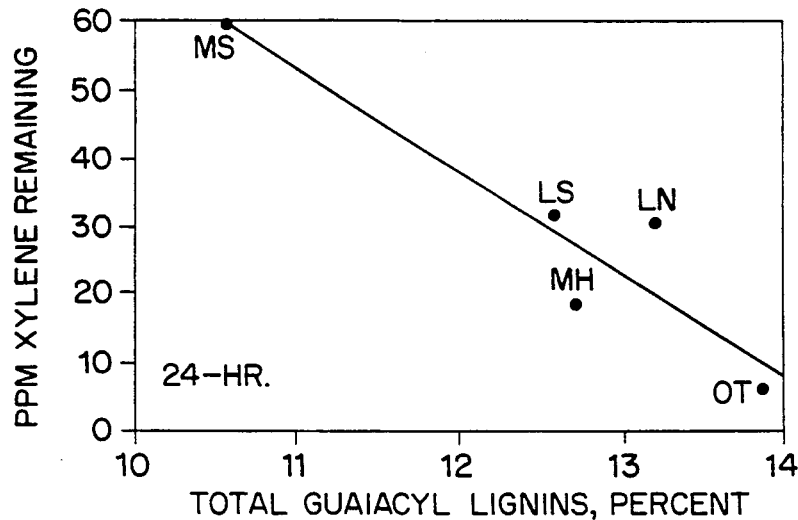
Figure 7C:
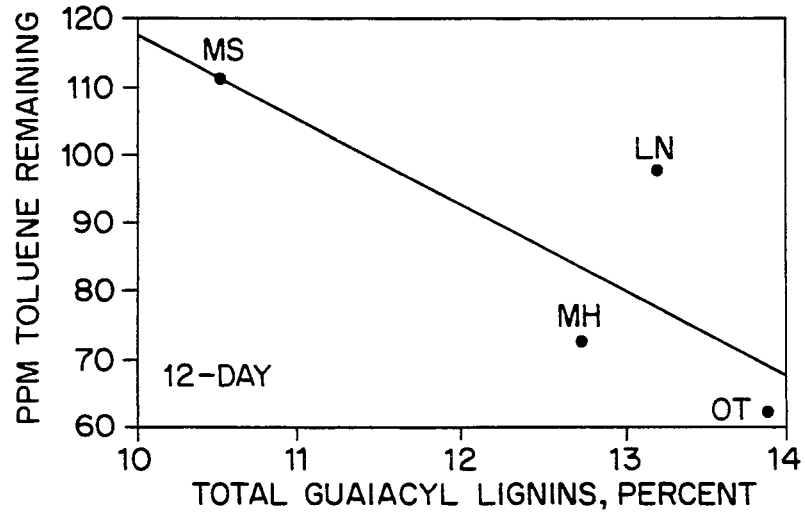

Ash content correlated strongly with adsorbency for m-xylene and toluene, and to a somewhat lesser degree for benzene (FIGS. 6A, 6B and 6C). As ash content increased, adsorbency increased. Although not enough data are available here to establish how much and what type of ash would be necessary to achieve the greatest adsorption, at least for m-xylene and toluene, the strong correlation between adsorbencies and total ash contents (despite the great inherent differences in inorganic composition of the samples tested—Table 4) suggest that ash type might be less important than total ash content.

Figure 8A:
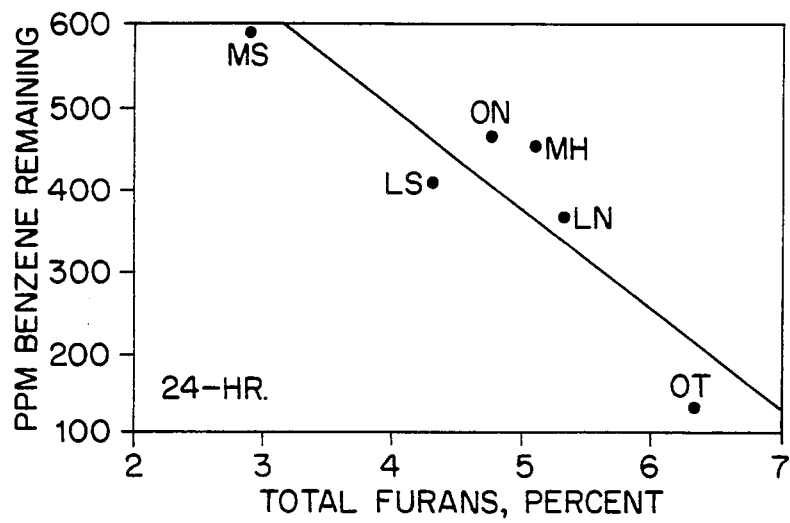
FIGS. 8A-8C depict experimental results obtained for various peat materials for hydrocarbon compound adsorption vs. peat material furan pyrolysis product content.
Figure 8B:
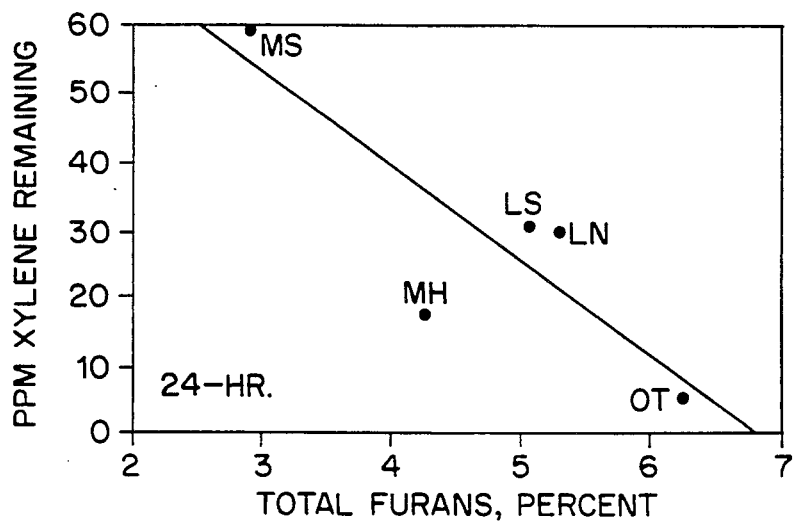
Figure 8C:
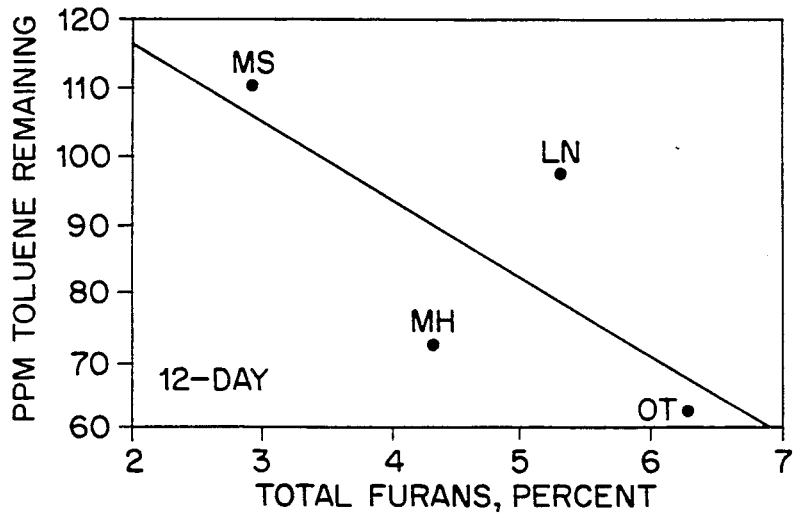

The organic chemical components that exhibited the strongest correlations with adsorbency were the guaiacyl lignins (FIGS. 7A, 7B and 7C) and the furans (FIGS. 8A, 8B and 8C). As either of these groups of pyrolysis products increased, adsorbency for any of the three hydrocarbons also increased. Guaiacyl lignin and furan content may be a function of either decomposition (with lignins increasing as celluloses are destroyed) or inherent chemistry of the plants that produced the peat. Woody peats (such as the Okefenokee Taxodium and Minnesota Hemic peats) would be expected to have higher lignin contents than moss peats (such as the Maine Sphagnum sample).

The foregoing results indicate that peat materials having a fiber content of preferably 80% or less, more preferably 60% or less, a birefringent organic content of preferably 80% or less, more preferably 60 or less, an ash content of preferably 25% or less, more preferably in the range of 5-25%, a guaiacyl lignin pyrolysis product content of preferably at least 10%, more preferably at least 12%, and a furan pyrolysis product content of preferably at least 0.1%, more preferably at least 2% are preferred in adsorbing hydrocarbon contaminants such as benzene, toluene and m-xylene from aqueous solution and hence are preferred for use in the method of this invention.

Figure 9A:
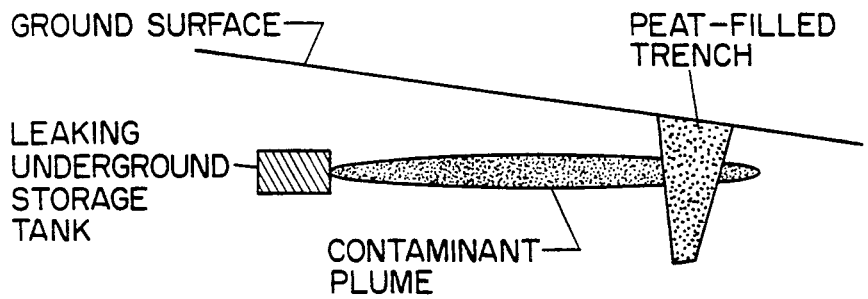
FIGS. 9A and 9B, respectively, depict cross-sectional and plan views of one embodiment of this invention.
Figure 9B:
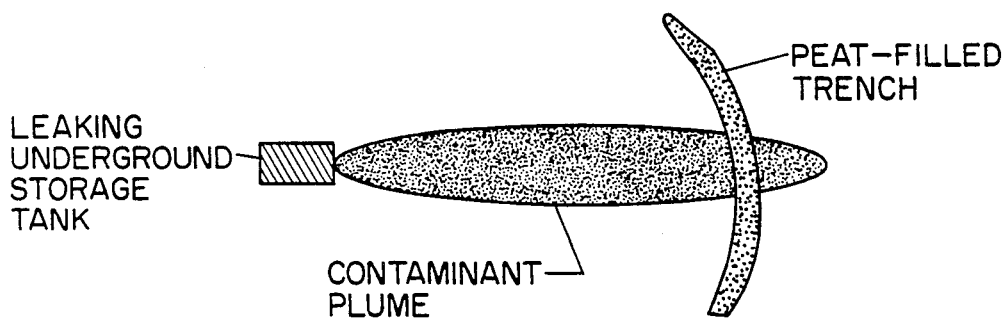

In one preferred embodiment of this invention, the permeable barrier comprises a peat material. A preferred embodiment of the method of this invention is depicted in FIG. 9, in which a contaminant plume resulting from a groundwater stream containing hydrocarbon contaminants in solution therein (originating, e.g., from a leaking underground fuel storage tank) is contacted in-situ with a permeable barrier which comprises a peat material. In this embodiment, the permeable barrier is positioned substantially perpendicular to the groundwater stream incident thereto by means of a trench which is dug in such manner as to contact the contaminated groundwater stream in a substantially perpendicular fashion. FIGS. 9A and 9B depict cross-sectional and plan views of this embodiment of the invention.

In another preferred embodiment of this invention, a contaminant plume resulting from a groundwater stream containing hydrocarbon contaminants in solution therein is contacted in-situ with a permeable barrier which comprises in series an immobilized nutrient layer and a peat material layer. The permeable barrier is positioned substantially perpendicular to the groundwater stream incident thereto, in such a manner that the contaminant-laden groundwater stream first contacts the immobilized nutrient layer and thereafter contacts the peat material layer. As used in this description and in the appended claims, the term "immobilized nutrient layer" refers to a layer which may typically comprise one or more inert material such as components selected from the group consisting of limestones, clays, iron oxides, coals, soils and fly ashes, such as disclosed, for example, in Thomson et al. discussed hereinabove.

Figure 10A:
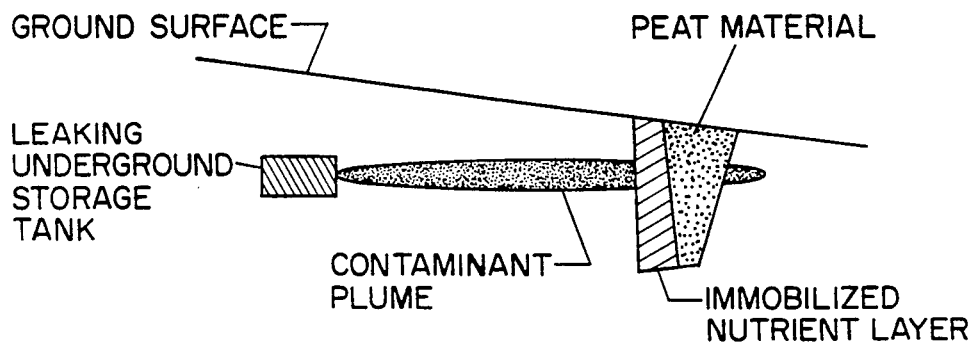
FIGS. 10A and 10B, respectively, depict cross-section and plan views of another embodiment of this invention.
Figure 10B:
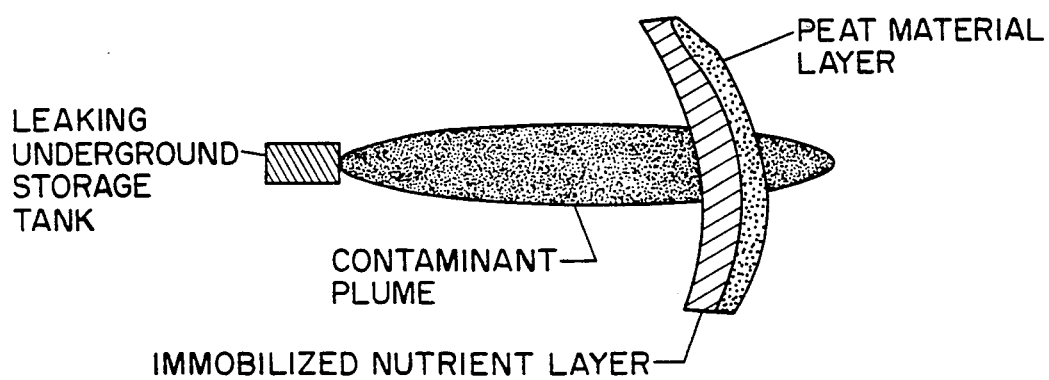

Cross-sectional and plan views of this embodiment of the invention are depicted in FIGS. 10A and 10B, respectively. As the contaminated groundwater stream or plume contacts the immobilized nutrient layer, the primary contaminant removal mechanism will be enhanced microbial growth, thereby removing some of the hydrocarbon contaminants. Those hydrocarbon contaminants which do not biodegrade will thereafter adsorb to the peat material which resides in the peat material layer. In addition, excess nitrate and other nutrients contained in the groundwater will be destroyed and/or adsorbed during passage through the peat material layer.

The combined immobilized nutrient layer-peat material layer embodiment of this invention is advantageous in several respects. First, any excess hydrocarbon contaminants not biodegraded in the immobilized nutrient layer will adsorb to the peat material layer. Second, any excess nitrates and other nutrients not consumed during hydrocarbon contaminant biodegradation in the immobilized nutrient layer will adsorb or be destroyed during passage through the peat material layer. In addition, the peat material is an excellent medium for growth of microorganisms to aid in the further removal of the hydrocarbon contaminants.

The following examples illustrate various preferred embodiments of this invention. It will be understood that the following examples are merely illustrative and are not meant to limit the invention in any way.

EXAMPLE 1

The method of this invention is employed by preparing a permeable barrier which is a peat material layer. The permeable barrier is built down-gradient from a groundwater stream containing hydrocarbon contaminants in solution therein resulting from a leaking underground gasoline storage tank. The permeable barrier is constructed by excavating a trench from the land surface to below the maximum depth of contamination of the groundwater stream (previously ascertained by well testing and/or other conventional monitoring means and back filling with appropriate media). A final cover of top soil may be placed on the media and seeded. The permeable barrier is positioned in such a manner that it is substantially perpendicular to the contaminated groundwater stream incident thereto. The permeable barrier has a volume and is constructed in such a manner that it has sufficient capacity to entirely contain the contaminated groundwater plume for a given period of time (e.g. 15-20 years). At the end of this period, if on site monitoring disclosed that hydrocarbon contaminants are still entering the permeable barrier, the barrier material may be excavated and replaced with fresh material.

EXAMPLE 2

The method of this invention is employed by preparing a permeable barrier which comprises, in series, an immobilized nutrient layer and a peat material layer. The permeable barrier is built down-gradient from a groundwater stream containing hydrocarbon contaminants in solution therein resulting from a leaking underground gasoline storage tank. The permeable barrier is constructed by excavating a trench from the land surface to below the maximum depth of contamination of the groundwater stream (previously ascertained by well testing and/or other conventional monitoring means) and back-filling with appropriate media. A final cover of top soil may be placed on the media and seeded. The permeable barrier is positioned in such a manner that it is substantially perpendicular to the contaminated groundwater stream incident thereto, with the groundwater stream first contacting the immobilized nutrient layer and thereafter contacting the peat material layer. The permeable barrier has a volume and is constructed in such a manner that it has sufficient capacity to entirely contain the contaminated groundwater plume for a given period of time (e.g. 15–20 years). At the end of this period, if on site monitoring discloses that hydrocarbon contaminants are still entering the permeable barrier, the barrier material may be excavated and replaced with fresh material. The immobilized nutrient layer is designed to have the capacity to release nitrate, ammonia, phosphate, bicarbonate and other inorganic nutrients to the groundwater stream incident thereto at a controlled rate. Ideally, the nutrient release rate is adjusted to approximately match the rate of hydrocarbon contaminants entering the trench.

Although this invention has been illustrated by reference to specific embodiments, it will be apparent to those skilled in the art that various changes and modifications may be made which clearly fall within the scope of this invention.

I claim:

1. A method for in-situ removal of hydrocarbon contaminants from groundwater, comprising contacting in-situ groundwater containing hydrocarbon contaminants in aqueous solution with a permeable barrier comprising a naturally occurring peat material having an ash content of 25% or less, a birefringent organic content of 80% or less, a fiber content of 80% or less, a guaiacyl lignin pyrolysis product content of at least 10%, and a furan pyrolysis product content of at least 0.1%.

2. A method according to claim 1, in which the hydrocarbon contaminants are the hydrocarbon components of gasoline.

3. A method according to claim 2, in which the hydrocarbon contaminants comprise benzene, toluene, xylene and mixtures thereof.

4. A method according to claim 1, in which the peat material has an ash content in the range of 5–25%, a birefringent organic content of 60% or less, a fiber content of 60% or less, a guaiacyl lignin pyrolysis product content of at least 12%, and a furan pyrolysis product content of at least 2%.

5. A method according to claim 1, in which the permeable barrier comprises in series a combination of an immobilized nutrient layer and a peat material layer.

6. A method according to claim 5, in which the immobilized nutrient layer comprises one or more components selected from the group consisting of limestones, clays, iron oxides, coals, soils, and fly ashes.

7. A method according to claim 1, in which the groundwater stream containing hydrocarbon contaminants in aqueous solution is contacted in-situ with a permeable barrier comprising a peat material, the permeable barrier positioned substantially perpendicular to the groundwater stream incident thereto.

8. A method according to claim 7, in which the groundwater stream containing hydrocarbon contaminants in aqueous solution is contacted in-situ with a permeable barrier which comprises in series an immobilized nutrient layer and a peat material layer, the permeable barrier positioned substantially perpendicular to the groundwater stream incident thereto, with the groundwater stream first contacting the immobilized nutrient layer and thereafter contacting the peat material layer.

* * * * *

UNITED STATES PATENT AND TRADEMARK OFFICE
CERTIFICATE OF CORRECTION

PATENT NO. : 5,057,227

DATED : October 15, 1991

INVENTOR(S) : Arthur D. Cohen

It is certified that error appears in the above-identified patent and that said Letters Patent is hereby corrected as shown below:

On the Title page;

In Section [56], References Cited, on page 1, the U.S. and foreign patent documents and articles cited by the Examiner on Form PTO-1449 in the Office Action dated December 26, 1990, as set forth below, were omitted and should be included:

U.S. Patent Document: 4,778,602  10/88  Allen  210/502.1
Foreign Patent Documents:  075384  3/1983  Europe
                          1135241  11/1982 Canada
                       DE 3305223  8/1984  Germany Other Documents:

B.M. Thomson & S.P. Shelton, "Permeable Barriers: A New Alternative For Treatment of Contaminated Ground Waters," Proceedings of the Focus Conference on Southwest Ground Water Issues, Association of Ground Water Scientists and Engineers, pp. 441-53 (Albuquerque, New Mexico 1988)

J.K. McLellan & C.A. Rock, "The Application of Peat In Environment Pollution Control: A Review," International Peat Journal, Vol. 1, pp. 1-14 (1986)

A.D. Cohen, "Obtaining More Precise Descriptions of Peat By Use Of Oriented Microtome Sections," in Testing of Peats And Organic Soils (P. Jarrett, Ed. 1982), ASTM STP 820, pp. 21-36

R.R. Raymond, Jr. et al., "Variation of Inorganic Content of Peat With Depositional and Ecological Setting," Recent Advances In Coal Geochemistry (L.L. Chyi et al., Eds. 1990), pp. 1-12

UNITED STATES PATENT AND TRADEMARK OFFICE
CERTIFICATE OF CORRECTION

PATENT NO. : 5,057,227

DATED     : October 15, 1991

INVENTOR(S) : Arthur D. Cohen

It is certified that error appears in the above-identified patent and that said Letters Patent is hereby corrected as shown below:

J.R. Durig et al., "Development of a Pyrolysis-Gas Chromatograph-Fourier Transform Infrared Spectroscopic Technique for the Study of Wood Peats," J. Anal. Appl. Pyrol., Vol. 14, pp. 295-308 (1989)

Col. 4, line 30, "its" should read -- it --; and

Col. 12, line 25, "Schagnum" should read
   -- Sphagnum --.

Signed and Sealed this

Twenty-seventh Day of April, 1993

Attest:

MICHAEL K. KIRK

*Attesting Officer*     *Acting Commissioner of Patents and Trademarks*